(No Model.)
H. A. SPEAR.
HEATING AND WATER CIRCULATING SYSTEM.
No. 527,626. Patented Oct. 16, 1894.
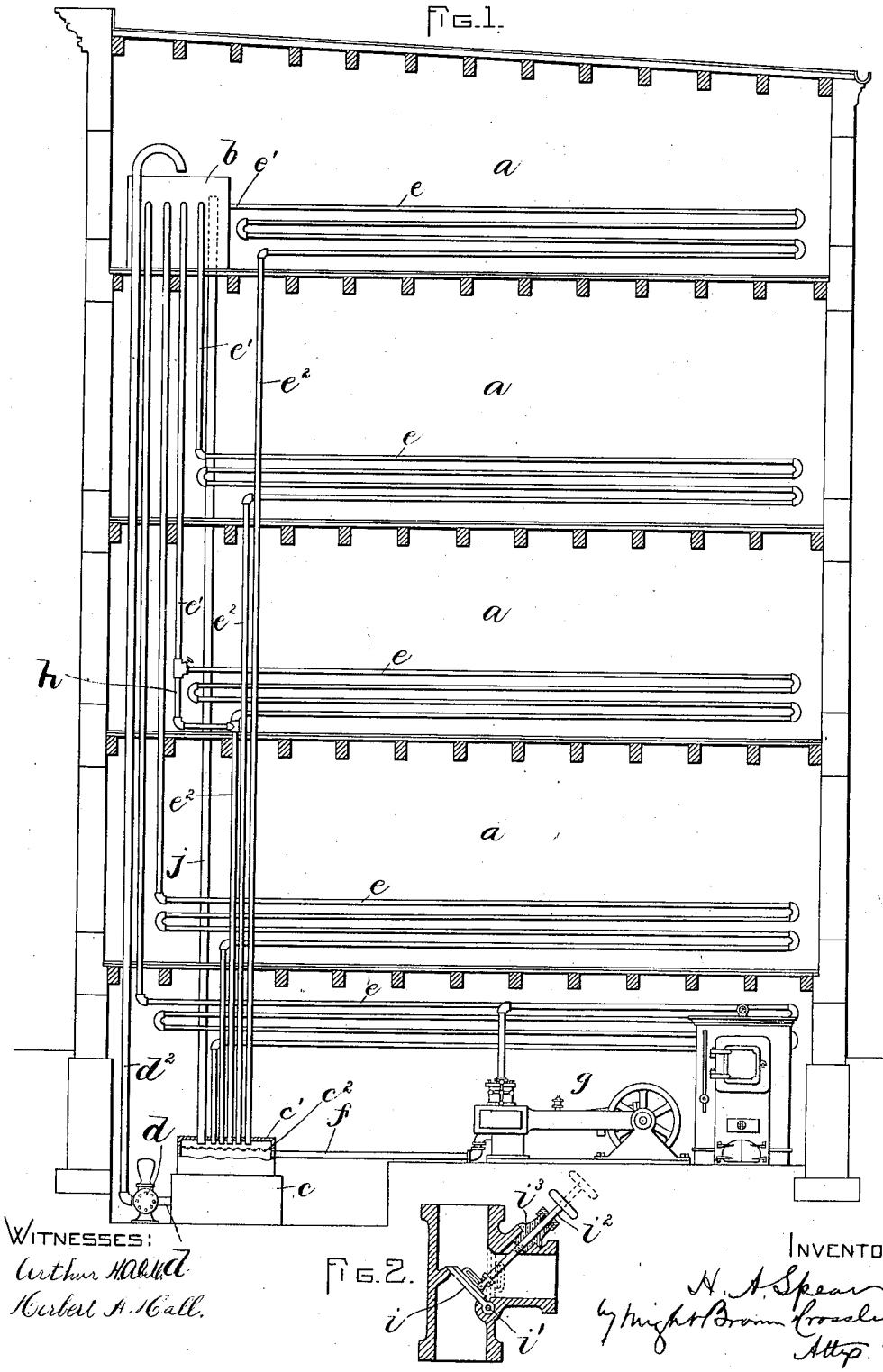

UNITED STATES PATENT OFFICE.

HENRY A. SPEAR, OF EVERETT, MASSACHUSETTS.

HEATING AND WATER-CIRCULATING SYSTEM.

SPECIFICATION forming part of Letters Patent No. 527,626, dated October 16, 1894.

Application filed February 8, 1894. Serial No. 499,488. (No model.)

*To all whom it may concern:*

Be it known that I, HENRY A. SPEAR, of Everett, in the county of Middlesex and State of Massachusetts, have invented certain new and useful Improvements in Heating and Water-Circulating Systems, of which the following is a specification.

This invention has for its chief object to utilize waste heat, for the purpose of warming buildings by imparting such heat to water, and circulating the heated water through the building to be heated.

The invention also has for its object to provide means for circulating the same water repeatedly through a building, primarily for heating purposes.

The invention consists in the improved water circulating system and certain details thereof, all of which I will now proceed to describe.

Of the accompanying drawings, forming a part of this specification, Figure 1 represents a sectional elevation of a building provided with my improved water heating and circulating system. Fig. 2 represents a sectional view of a detail of the apparatus hereinafter referred to.

The same letters of reference indicate the same parts in both the figures.

In the drawings, $a\ a\ a$ represent different apartments of a building, and $b$ represents a tank or reservoir located in the upper portion of the building. The object of said tank being to supply water under head or pressure to conduits which conduct the water by gravitation to the lower portion of the building, I shall hereinafter term said tank a "head reservoir."

$c$ represents a reservoir at the lower portion of the building, arranged to receive water from the head reservoir through the conduits hereinafter described.

$d$ represents a pump which may be driven by any suitable source of power, such as steam or electricity. Said pump is connected by the pipe $d'$ with the return water reservoir $c$, and by a pipe $d^2$ with the head reservoir $b$, so that when said pump is in operation, water will be raised thereby from the reservoir $c$ to the reservoir $b$. I provide a series of conduits to conduct the water from the head reservoir to the return water reservoir, each conduit comprising a radiating section $e$, of which there may be one for each apartment. Each conduit also comprises an inlet section $e'$ connecting the radiator with the head reservoir $b$, and an outlet section $e^2$ connecting the radiating section with the return water reservoir $c$. Each of the said conduits is adapted to conduct water by gravitation from the head reservoir to the return water reservoir, the radiating sections being suitably inclined so that the water will flow continuously through them.

Means are employed to heat the return water, said means being here shown as a steam pipe $f$ adapted to conduct exhaust steam from an engine $g$ to a vapor chamber $c'$ formed on and communicating with the reservoir $c$. The outlet sections of the several conduits enter the chamber $c'$ and discharge the water upon a foraminous partition $c^2$ in said chamber, said partition being preferably composed of wire cloth. The steam pipe $f$ enters the chamber below said partition. The return water is subdivided by the partition and distributed so that it is acted on by the steam and quickly heated thereby, the steam being at the same time condensed. I do not limit myself, however, to this means of heating the water, and may use any other suitable means, without departing from the spirit of my invention. For example, the water may be passed through a flue or passage which conducts heat from a furnace to a stack or chimney, and the water absorbing in this way the heat that would otherwise be wasted.

$h$ represents a by-pass, here shown as connecting the inlet section $e'$ of one of the conduits with the outlet section $e^2$ of the same conduit, the object of said by-pass being to enable the return water to pass directly from the inlet to the outlet section without passing through the radiator. Means are provided for closing the receiving ends of the radiating section and of the by-pass, so that either may be closed while the other is left open. In Fig. 2 I show as a convenient means of accomplishing this purpose, a valve $i$ which is hinged at $i'$ in the by-pass, and is arranged to cover either the entrance to the radiating section as shown by dotted lines, or the entrance to the by-pass, as shown in full lines, said valve being operated by a stem $i^2$, which is adapted to slide in a stuffing-box $i^3$, and is suitably connected to the valve. When the valve is in its dotted-line position, the water will flow through the by-pass without entering the radiating section; and when the valve is in its full-line position, the by-pass will be inoperative, the water passing through the radiating section.

$j$ represents an overflow pipe which extends from the head reservoir to the return water reservoir, the upper end of said pipe being above the points where the return water conduits are connected to the head reservoir, so that in case the water rises too high in the head reservoir it will flow into the return water reservoir.

It will be seen that the above-described apparatus comprises an efficient means for circulating hot water through a building, and for heating the same by waste heat, so that the building may be economically warmed, the expense of maintaining heat being mainly that required to operate the pump.

If desired, a special furnace or heater may be employed to heat the return water, either in addition to the means for utilizing waste heat, or as a substitute for said means.

Any suitable over-flow passage from the tank $b$ may be provided, for relieving the system from surplus water which may accumulate as the result of the condensation of steam, and when the tanks and radiators are kept full of water. When a less quantity of water is kept in the system, an overflow outlet may be provided in the lower tank.

With my system, the temperature of the radiators can be regulated with greater nicety than with such systems as must be kept full of water to be operative, for the reason that the water will flow through the radiators in such quantities as may be furnished by the pump only. For instance, when the upper tank is only full enough for the water to merely trickle through the radiators, and only enough water in the lower tank to be above the level of the pump supply pipe $d'$, then the pump can be operated with just sufficient speed to keep the water trickling through the radiators. By increasing the speed of the pumping operations, more water can be caused to flow through the radiators, and consequently greater heating capacities will result.

I claim—

1. A water-circulating system comprising an elevated head reservoir open to atmospheric pressure, a return water reservoir located at a lower point, a pump having connections with both reservoirs and adapted to raise water from the lower to the higher reservoir, and a series of radiating return pipes or conduits each connected with the two reservoirs, whereby they may conduct water by gravitation from the head reservoir to the return water reservoir.

2. A water-circulating system comprising an elevated head reservoir open to atmospheric pressure, a return water reservoir located at a lower point, a pump having connections with both reservoirs and adapted to raise water from the lower to the higher reservoir, a series of radiating return pipes or conduits arranged to conduct water by gravitation from the head reservoir to the return water reservoir, and means for heating the water returned by said pipes.

3. A water-circulating system comprising an elevated head reservoir open to atmospheric pressure, a return water reservoir located at a lower point, an exhaust steam pipe connecting said return water reservoir with a source of steam supply whereby the water in said reservoir may be heated, a pump having connections with both reservoirs and adapted to raise water from the lower to the higher reservoir, and a series of radiating return pipes or conduits arranged to conduct water by gravitation from the head reservoir to the return water reservoir.

4. A heating system for buildings, comprising an elevated head reservoir at the upper portion of the building, a return water reservoir at the lower portion of the building, a pump adapted to raise water from the lower to the higher reservoir, a return water conduit comprising a radiating section, an inlet section connecting one end of the radiating section with the head reservoir, an outlet section connecting the opposite end of the radiating section with the return water reservoir, and a by-pass connecting the said inlet and outlet sections, said by-pass and the receiving end of the radiating section having controlling means whereby the descending water may be caused to pass either through the radiator or through the by-pass.

5. A water-circulating system comprising an elevated head reservoir; a return water reservoir located at a lower point; a pump connected with both reservoirs and adapted to raise water from the lower to the higher reservoir; and a return water conduit comprising a radiator section, an inlet section connecting the radiator with the head reservoir, and an outlet section connecting the radiator with the return water reservoir.

In testimony whereof I have signed my name to this specification, in the presence of two subscribing witnesses, this 1st day of February, A. D. 1894.

HENRY A. SPEAR.

Witnesses:
C. F. BROWN,
A. D. HARRISON.